United States Patent
Roller et al.

(10) Patent No.: US 10,962,349 B2
(45) Date of Patent: Mar. 30, 2021

(54) DEVICE FOR MEASURING POINTS IN SPACE

(71) Applicant: Flexijet GmbH, Bad Oeynhausen (DE)

(72) Inventors: Thomas Roller, Freudenstadt (DE); Urs Reich, Dornstetten (DE); Thomas Fischer, Dornstetten (DE)

(73) Assignee: Flexijet GmbH, Bad Oeynhausen (DE)

( * ) Notice: Subject to any disclaimer, the term of this patent is extended or adjusted under 35 U.S.C. 154(b) by 384 days.

(21) Appl. No.: 15/951,224

(22) Filed: Apr. 12, 2018

(65) Prior Publication Data

US 2018/0313641 A1 Nov. 1, 2018

(30) Foreign Application Priority Data

Apr. 27, 2017 (DE) .................. 10 2017 109 032.0

(51) Int. Cl.
| | | |
|---|---|---|
| *G01C 3/08* | (2006.01) | |
| *G01B 9/02* | (2006.01) | |
| *G01C 15/00* | (2006.01) | |
| *G01C 3/02* | (2006.01) | |
| *G01B 11/14* | (2006.01) | |
| *G01D 11/24* | (2006.01) | |
| *G01D 11/30* | (2006.01) | |
| *G01S 7/481* | (2006.01) | |
| *G01S 17/42* | (2006.01) | |

(52) U.S. Cl.
CPC .......... *G01B 9/02083* (2013.01); *G01B 11/14* (2013.01); *G01C 3/02* (2013.01); *G01C 15/002* (2013.01); *G01D 11/24* (2013.01); *G01D 11/30* (2013.01); *G01S 7/4813* (2013.01); *G01S 17/42* (2013.01)

(58) Field of Classification Search
CPC ........ G01C 15/002; G01C 3/02; G01D 11/30; G01D 11/24; G01D 11/14; G01B 9/02083; G01S 7/4813; G01S 17/42
USPC .......................................................... 356/3.02
See application file for complete search history.

(56) References Cited

U.S. PATENT DOCUMENTS

| | | | |
|---|---|---|---|
| 5,742,341 A * | 4/1998 | Ohishi ................ | H04N 5/2252 348/373 |
| 6,215,524 B1 | 4/2001 | Shiozaki | |
| 2015/0153200 A1 * | 6/2015 | Grasser ................ | G01C 15/00 73/1.75 |
| 2017/0150077 A1 * | 5/2017 | Matsuo ................ | H04N 5/361 |
| 2018/0135969 A1 * | 5/2018 | Vandenhoudt ......... | G01B 11/14 |

FOREIGN PATENT DOCUMENTS

DE 20 2007 010 475 12/2007

* cited by examiner

*Primary Examiner* — Mark Hellner
(74) *Attorney, Agent, or Firm* — Faegre Drinker Biddle & Reath LLP

(57) ABSTRACT

A device for measuring spatial points includes an ergonomic manual handle for facilitating efficient three-dimensional measurement using data processing.

13 Claims, 10 Drawing Sheets

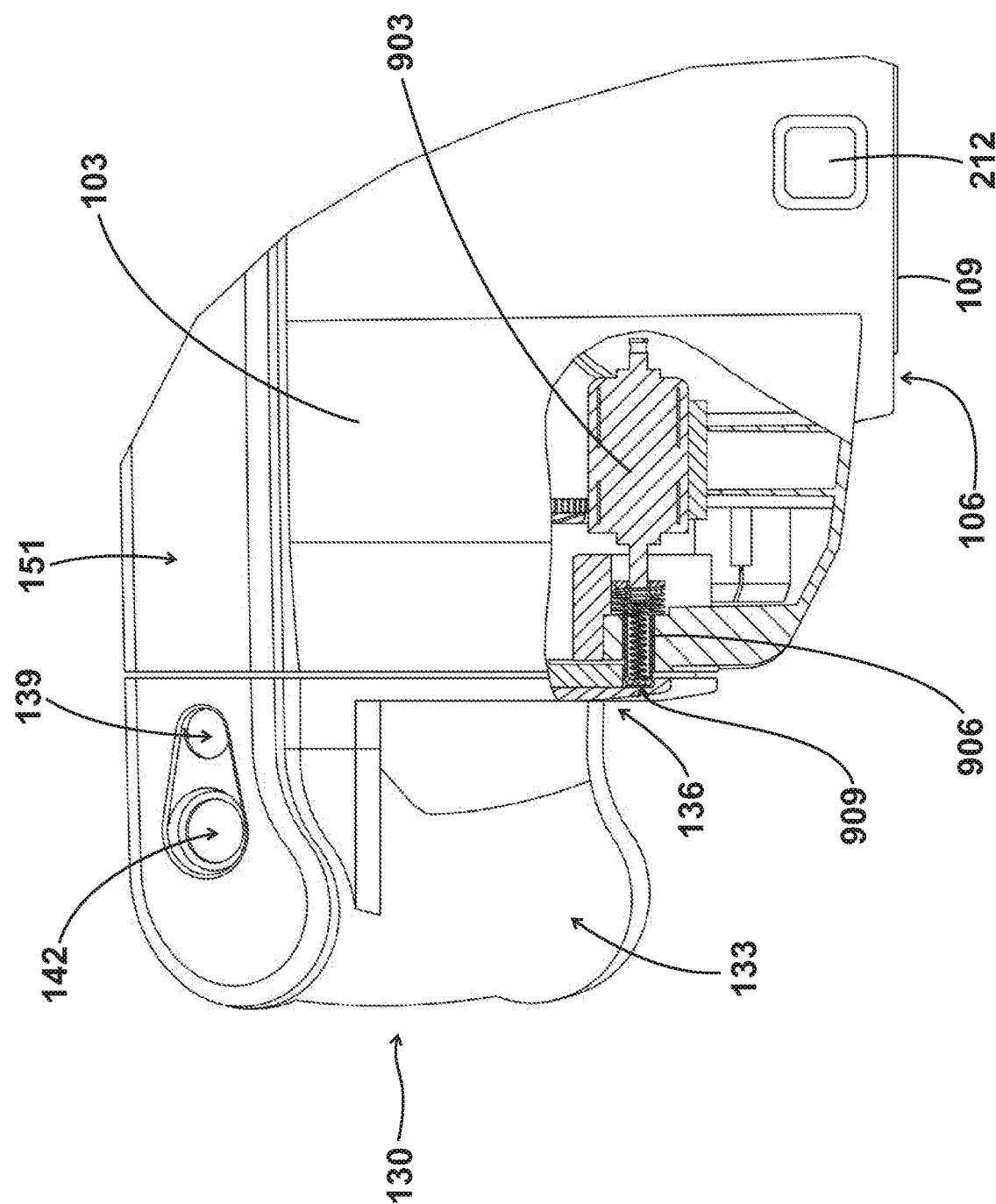

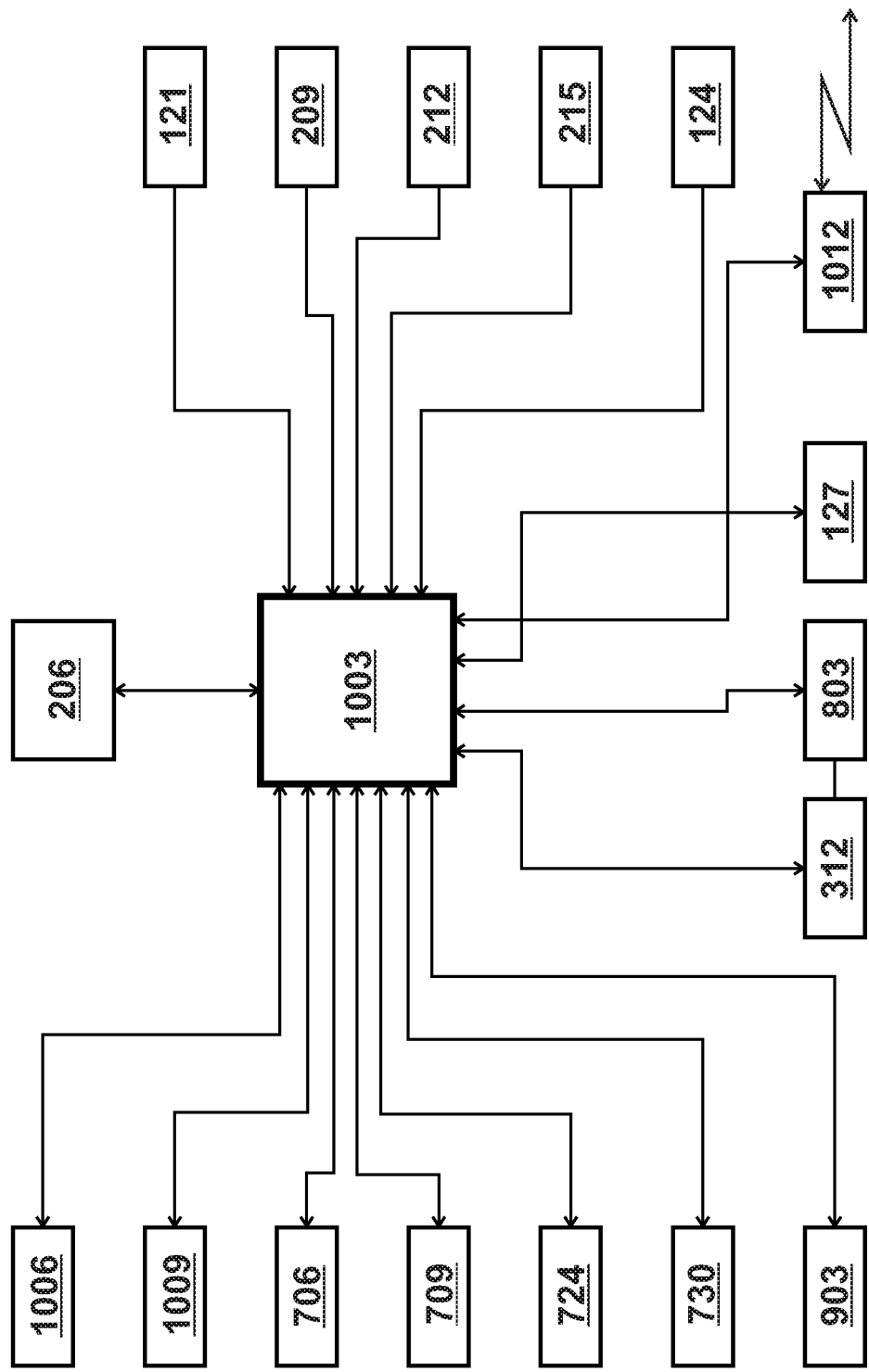

DEVICE FOR MEASURING POINTS IN SPACE

CROSS-REFERENCE TO RELATED APPLICATIONS

This application claims priority to German Patent Application No. 10 2017 109 032.0 filed Apr. 27, 2017, the entire disclosure of which is hereby explicitly incorporated by reference herein.

BACKGROUND OF THE INVENTION

1. Field of the Invention

The present invention relates to a device for measuring spatial points.

2. Description of the Related Art

A device of this type is known from DE 20 2007 010 475 U1. This previously known device has a housing, which with a bottom side is fastenable to a tripod so as to be rotatable about a rotational axis. In addition, a distance measuring unit is present which is situated at a radial distance from the rotational axis so as to be pivotable about a pivot axis oriented at right angles to the rotational axis. The distance measuring unit is rotatably mounted at an end section of a connecting piece, and the other end section is rigidly connected to the housing. For a central arrangement of the distance measuring unit in a transverse direction, the pivot axis is situated at a radial distance from the rotational axis. In the previously known device, the measured spatial points are transmitted to a data processing unit, where they are further processed in particular to create a three-dimensional model of the measured surroundings.

SUMMARY OF THE INVENTION

The present invention provides a device for measuring spatial points, which for ergonomic manual handling is characterized by efficient provision of a three-dimensional measurement, also using data processing.

Due to the fact that the device according to the invention may move similarly to a steering wheel of a motor vehicle used in racing, as a result of the handle sections being situated on the sides of the housing, and that the spatial points may be supplemented with additional data, such as the type of spatial points, directly during measurement of spatial points prior to consolidation in further processing, via the measuring control elements ergonomically situated on the handle sections, this results in efficient use in handling as well as in data processing.

In one form thereof, the present invention provides a device for measuring spatial points, including a housing, which with a bottom side is fastenable to a tripod so as to be rotatable about a rotational axis, and a distance measuring unit that is situated at a radial distance from the rotational axis so as to be pivotable about a pivot axis oriented at right angles to the rotational axis, characterized in that the housing is provided with a handle section situated on the edge on both sides of the rotational axis, one handle section being rigidly connected to the housing, the other handle section being pivotably connected to the housing via a pivot joint, the distance measuring unit is integrated into the handle section which is pivotably connected to the housing, at least one handle section bears at least one measuring control element, and the or each measuring control element is coupled to a preprocessing unit, with which additional data are assignable to spatial points.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 9 shows a rear view corresponding to FIG. 1 of the exemplary embodiment according to FIG. 1 with a partially cutaway area; and FIG. 10 shows a block diagram of the circuitry of important electromechanical, electrical, and electronic elements of the exemplary embodiment illustrated with reference to the above figures.

Figure 1:
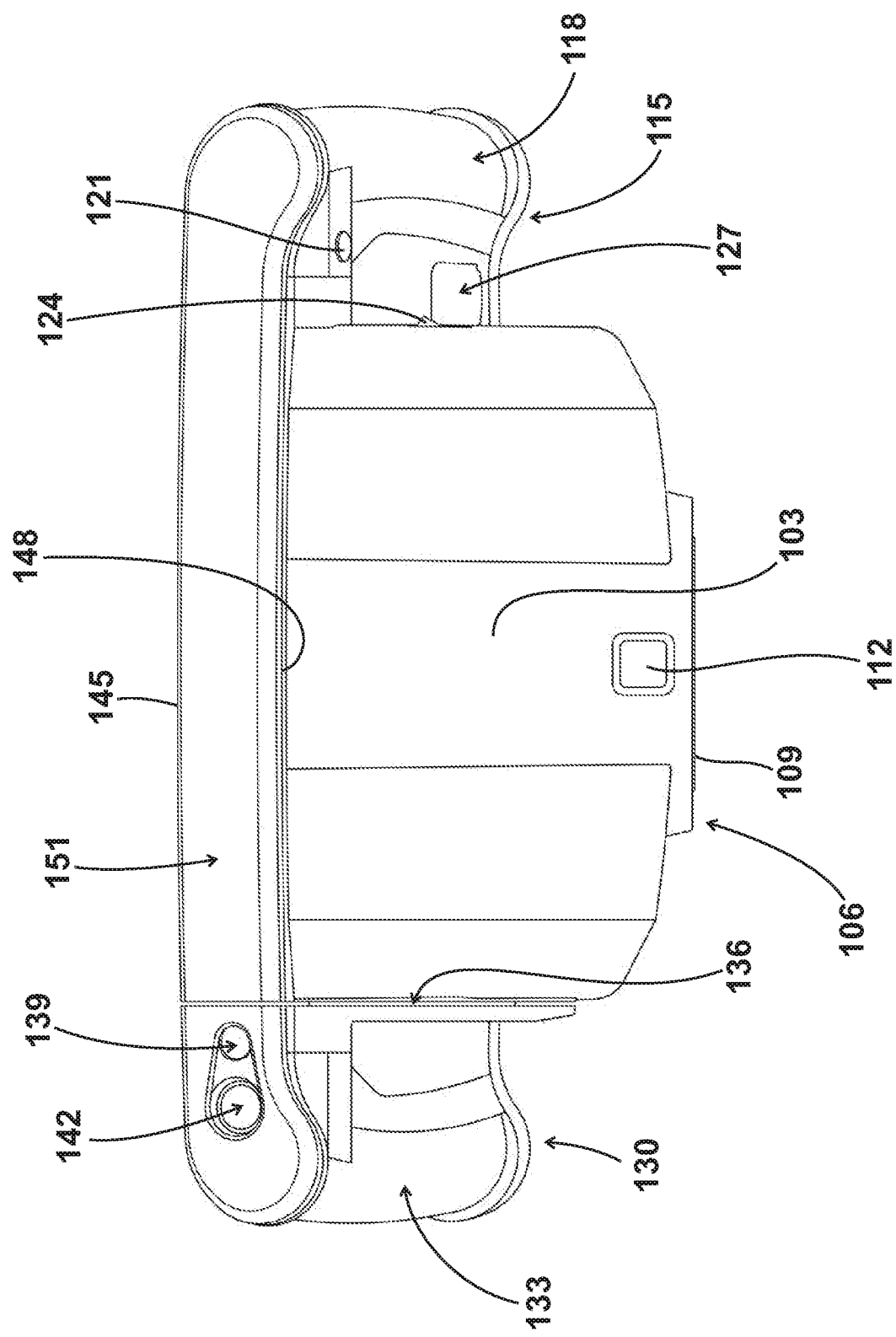
FIG. 1 shows a rear view of one exemplary embodiment of a device according to the invention, with a central housing, a handle section that is rigidly connected at the edge of the housing in a transverse direction, and a further handle section that is pivotably mounted on the housing, opposite from the rigid handle section

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

FIG. 1 shows a rear view of one exemplary embodiment of a device according to the invention. The exemplary embodiment according to FIG. 1 has a central housing 103 in which a mounting plate 109 for connecting the housing 103 to a tripod, not illustrated in FIG. 1, is situated on a bottom side 106 so as to be rotatable about a longitudinal axis. A rotary locking knob 112, which in this exemplary embodiment is actuatable by purely mechanical means, is present for locking the mounting plate 109, oriented at right angles to the longitudinal axis, against rotation, in particular for simplifying mounting on a tripod.

In the exemplary embodiment according to FIG. 1, a fixed handle 115 as a handle section is rigidly connected to the housing 103 in a transverse direction on one side of the housing 103. An end section 118 of the fixed handle 115 facing away from the housing 103 is bent in the direction pointing toward the bottom side 106, so that it may be well gripped by the fingers of one hand of a user in a manner that is ergonomically advantageous. The fixed handle 115 likewise has a special function button 121, as a measuring control element, on its side facing the bottom side 106, which by pressing may be used to manipulate an electrical line, for example by closing a contact.

Situated on the side of the housing 103 facing the fixed handle 115 is a main switch 124 via which the electrical functionalities of the exemplary embodiment according to FIG. 1 may be switched on and off. The fixed handle 115 accommodates a USB interface 127 at a well accessible location, via which a wired electrical connection may be established for data exchange with external devices, not illustrated in FIG. 1.

On the side of the housing 103 opposite from the fixed handle 115, the exemplary embodiment according to FIG. 1 has a swivel handle 130 as a further handle section, which in its external shape is a mirror image of the fixed handle 115, and which is provided with a bent end section 133 pointing in the direction of the bottom side 106. However, the swivel handle 130 is supported via a pivot joint 136 so as to be pivotable about a transverse axis oriented at right angles to the longitudinal axis, and accommodates a distance measuring unit and a camera, of which a radiation window 139 for an intensity-modulated radiation source, advantageously designed as a laser, for exit and re-entry of its radiation, and a camera window 142 for acting on the camera, situated behind same, with ambient light from the visual field of the camera are shown in the illustration according to FIG. 1. The distance of the exemplary embodiment according to FIG. 1 from a targeted spatial point is determinable with the distance measuring unit in a manner known per se. The camera is used as an aid for spatial points situated farther away, and for documentation by storing images containing measured spatial points.

In the arrangement according to FIG. 1, the swivel handle 130 is illustrated with border edges 145, 148 in flush alignment in the area of the pivot joint 136, so that a cover side 151, facing the observer in the illustration according to FIG. 1, has a design similar to the upper closure, the so-called capital, of an Ionic column.

Figure 2:
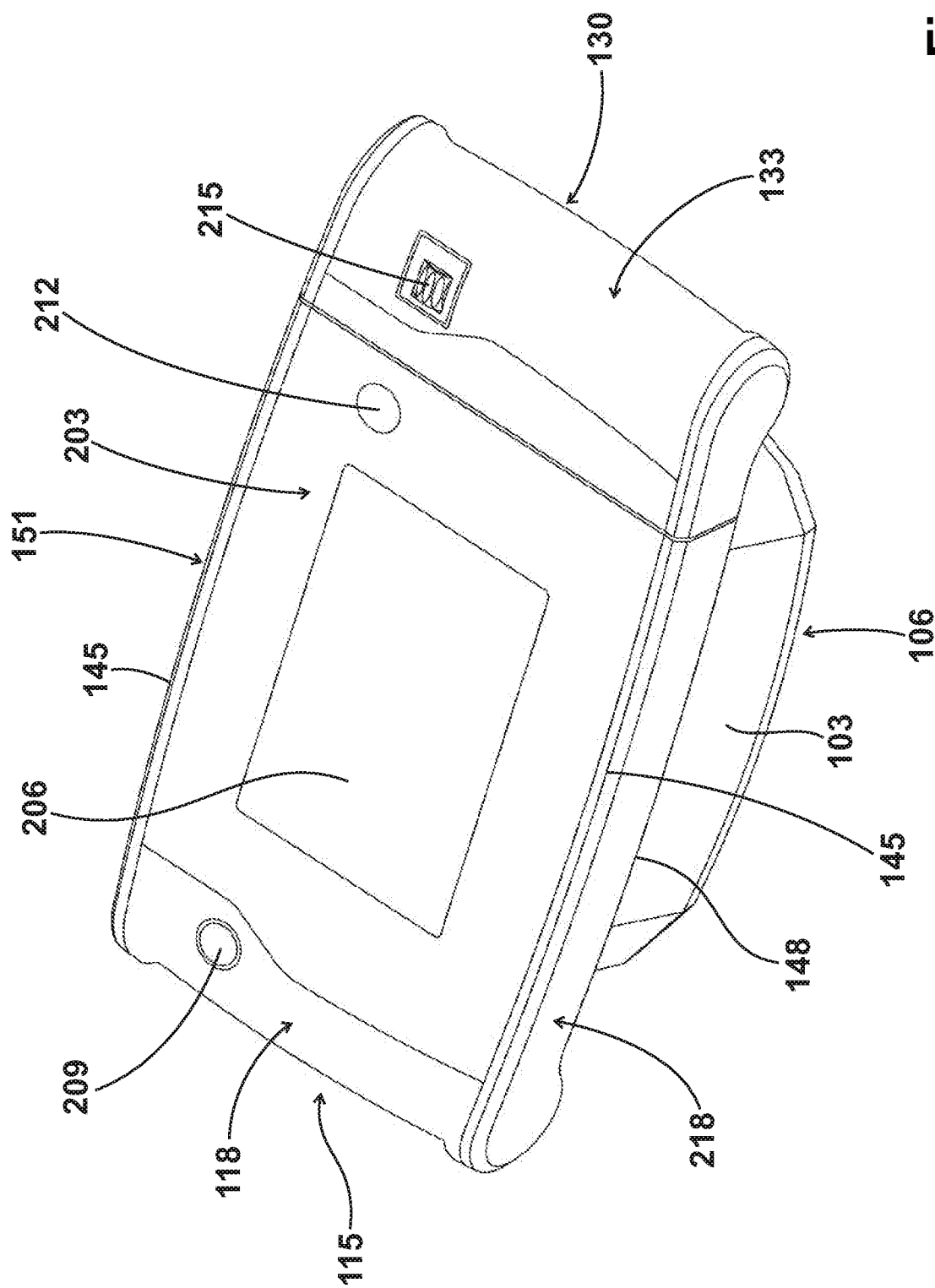
FIG. 2 shows a perspective view of the exemplary embodiment according to FIG. 1 with a view of a front side that faces a user in a typical operating position.

FIG. 2 shows a perspective view of the exemplary embodiment according to FIG. 1, with a view of a top side 203 opposite from the bottom side 106 of the housing 103. On the top side 203, a preferably touch-sensitive screen 206 is situated in the housing 103, and on which, as explained in greater detail below, measured spatial points are displayable with additional data, for example lines and surfaces, typical of the surroundings, that connect selected spatial points. As a further measuring control element, a measurement trigger button 209 with which a measuring operation is triggerable, with determination of a distance and an angular position of the exemplary embodiment, for a spatial point to be measured is situated on the side of the screen 206 facing the fixed handle 115. An on/off push switch 212 with which the exemplary embodiment is transferrable into a rest or off mode during measurement pauses in order to reduce the consumption of electrical power when the main switch 124, not visible in FIG. 2, is in an on setting, is present on the side of the screen 206 opposite from the measurement trigger button 209.

In addition, it is apparent from the illustration according to FIG. 2 that a rotary pushbutton 215 is integrated into the swivel handle 130 on the top side 203, with which predetermined measuring control functions are triggerable by rotating and pressing, similarly as for a multifunctional control wheel of a computer mouse.

Lastly, it is apparent from the illustration according to FIG. 2 that the illustrated exemplary embodiment, in the arrangement of the swivel handle 130 according to FIG. 2, is provided with a rear side 218, corresponding to the cover side 151 and opposite from the cover side 151, so that the device has a design similar to a steering wheel of a motor vehicle used in racing, with an optimum shape that lies in a user's hand in an ergonomic, user-friendly manner.

Figure 3:
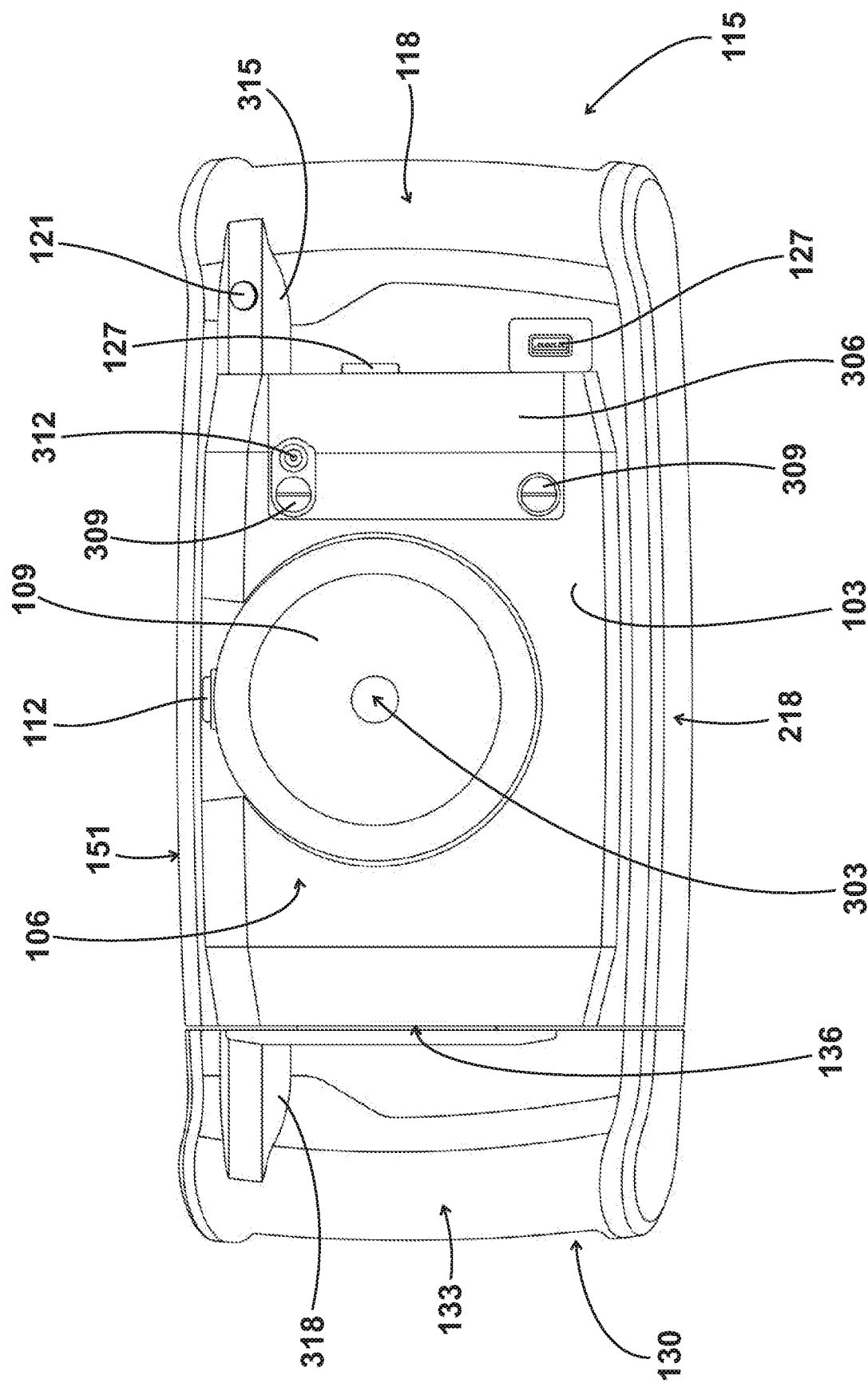
FIG. 3 shows a view of the exemplary embodiment according to FIG. 1, with a view of a rear side facing away from the front side.

FIG. 3 shows the exemplary embodiment, explained with reference to FIGS. 1 and 2, in a view of the bottom side 106. It is apparent from FIG. 3 that the mounting plate 109 has a centrally situated tripod connecting thread 303 into which a tripod fastening screw, not illustrated in FIG. 3, connected to a tripod, likewise not illustrated in FIG. 3, may be screwed. In addition, it is apparent from the illustration according to FIG. 3 that a cover 306, which with closure screws 309 detachably covers a battery compartment for accommodating a rechargeable battery, is integrated into the housing 103. A charge socket 312 is present for charging the rechargeable battery.

Furthermore, it is apparent from the illustration according to FIG. 3 that a cross bar 315, 318 extending in the transverse direction is provided, respectively, on the fixed handle 115 and the swivel handle 130 in the side areas facing the cover side 151, and secures a user's hands from sliding past the cover side 151. For good ergonomics, the special function button 121 is advantageously situated on the cross bar 315 of the fixed handle 115.

Figure 4:
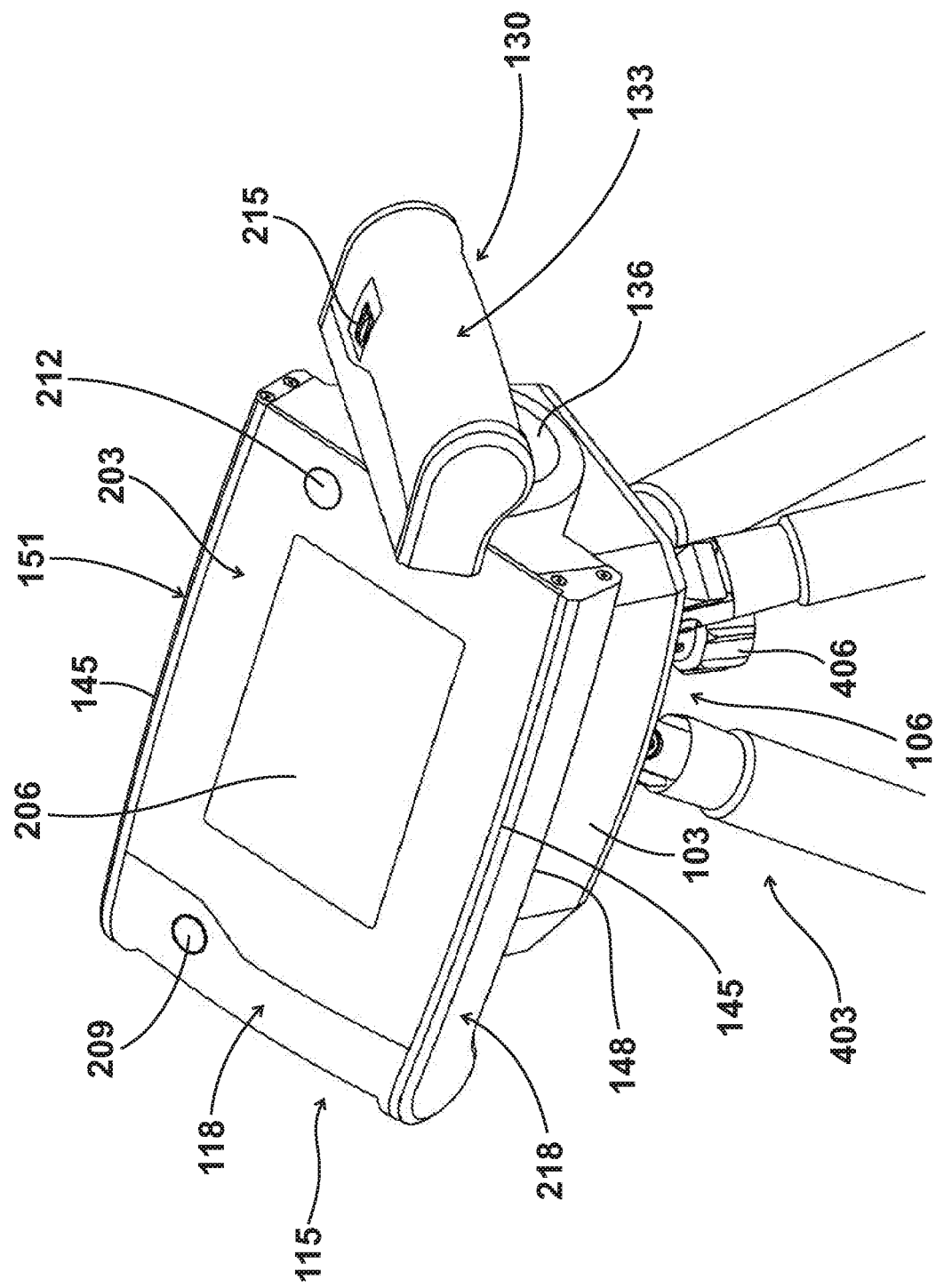
FIG. 4 shows a perspective view, corresponding to FIG. 2, of the exemplary embodiment according to FIG. 1 in an operating position with a tripod connected to the pivotable handle section in a pivot position having an approximately horizontal orientation

FIG. 4 shows a perspective view, corresponding to FIG. 2, of the explained exemplary embodiment of the invention in a mounted position, with a connected tripod 403 that is partially illustrated in FIG. 4, in which the bottom side 106 of the housing 103 is oriented essentially horizontally. It is particularly apparent from the illustration according to FIG. 4 that the top side 203, opposite from the bottom side 106, is inclined with the screen 206 facing an observer, so that the screen 206 may be comfortably viewed by a user, and in particular the fixed handle 115 may be gripped in an ergonomically favorable manner with only relatively slight bending of the wrist.

As mentioned above, the tripod 403 is fixedly and detachably connectable to the mounting plate 109, not visible in the illustration according to FIG. 4, via a fastening screw 406.

In the arrangement according to FIG. 4, the swivel handle 130, compared to the arrangement according to FIGS. 1 through 3, is illustrated in a pivot position with an approximately horizontally swiveled orientation, in which a spatial point, situated ahead approximately horizontally, may be targeted.

Figure 5:
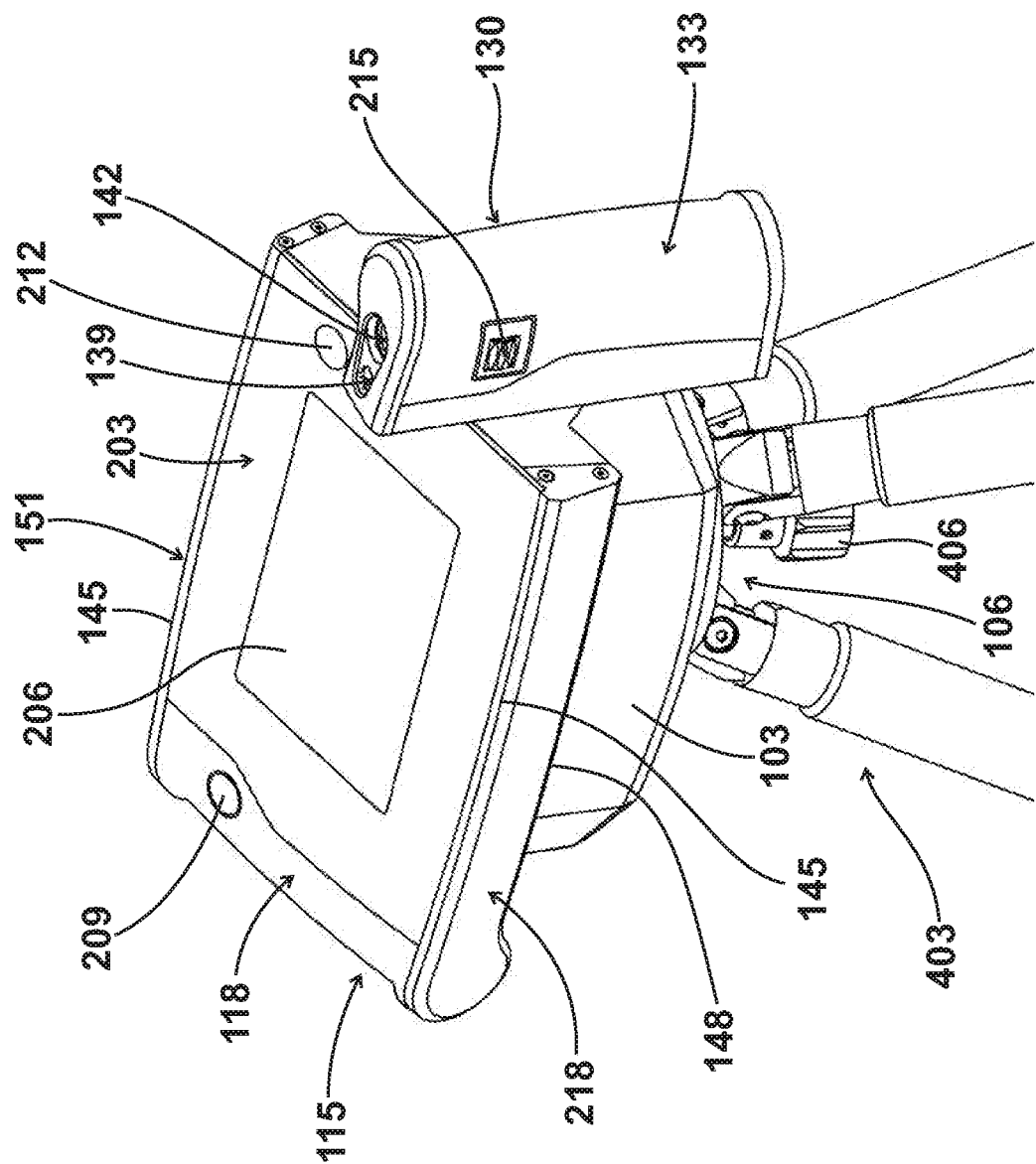
FIG. 5 shows a perspective view, corresponding to FIG. 2, of the exemplary embodiment according to FIG. 1 in an operating position with a tripod connected, with the pivotable handle section in a further pivot position having a vertical orientation

FIG. 5 shows a perspective view of the arrangement according to FIG. 4, with the swivel handle 130 in a further pivot position in which the radiation window 139 and the camera window 142 point vertically upwardly, for example in the direction of the ceiling of a room.

Figure 6:
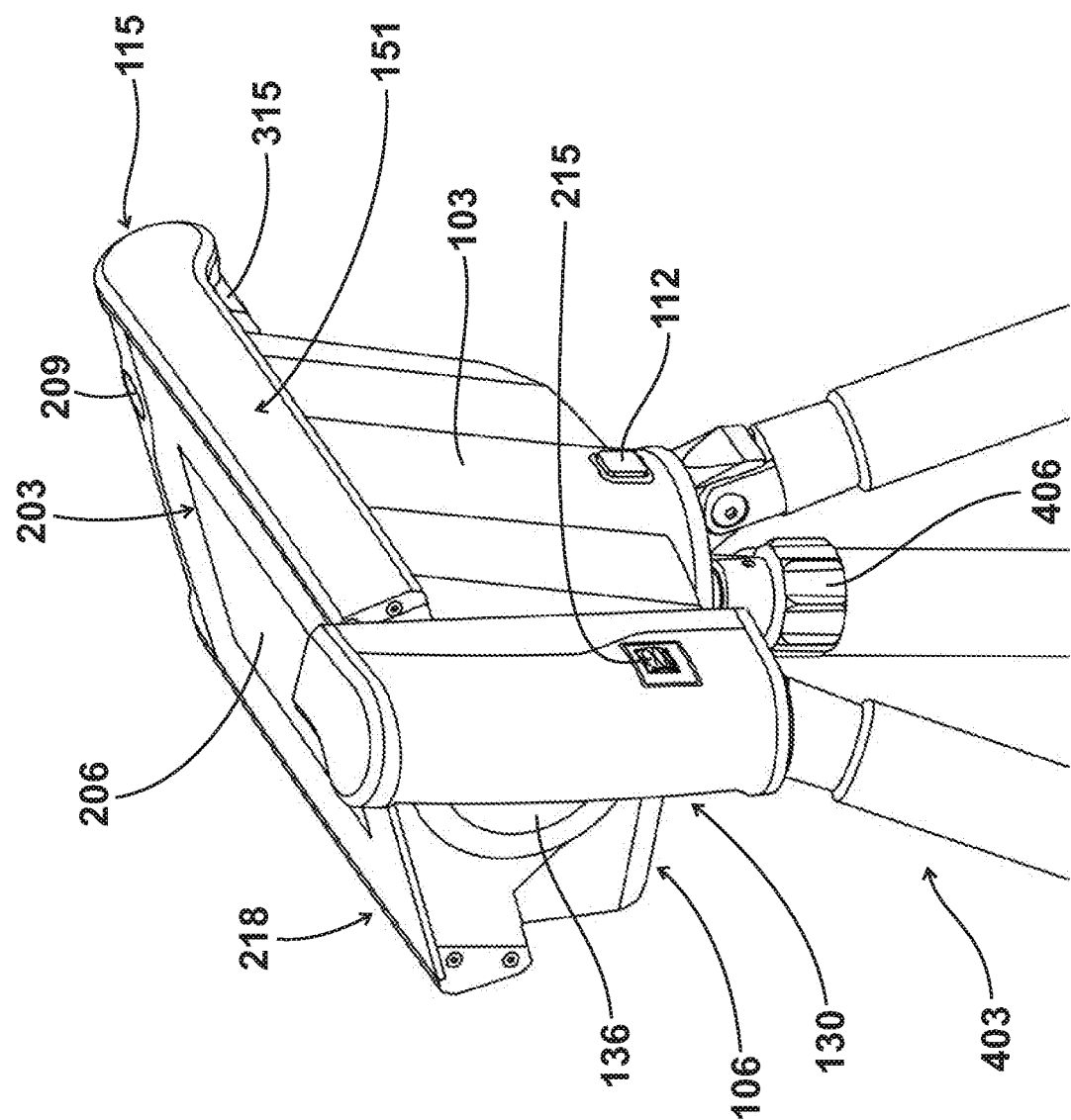
FIG. 6 shows a perspective view, corresponding to FIG. 2, of the exemplary embodiment according to FIG. 1 in an operating position with a tripod connected, with the pivotable handle section in a further pivot position having a further vertical orientation

FIG. 6 shows a perspective view of the explained exemplary embodiment similar to FIG. 5, with the swivel handle 130 in a further pivot position that is oriented vertically downwardly, and in which a spatial point situated on a floor area may be targeted due to the positioning of the swivel handle 130, shifted radially outwardly with respect to the mounting plate 109, between the legs of the tripod 403.

Figure 7:
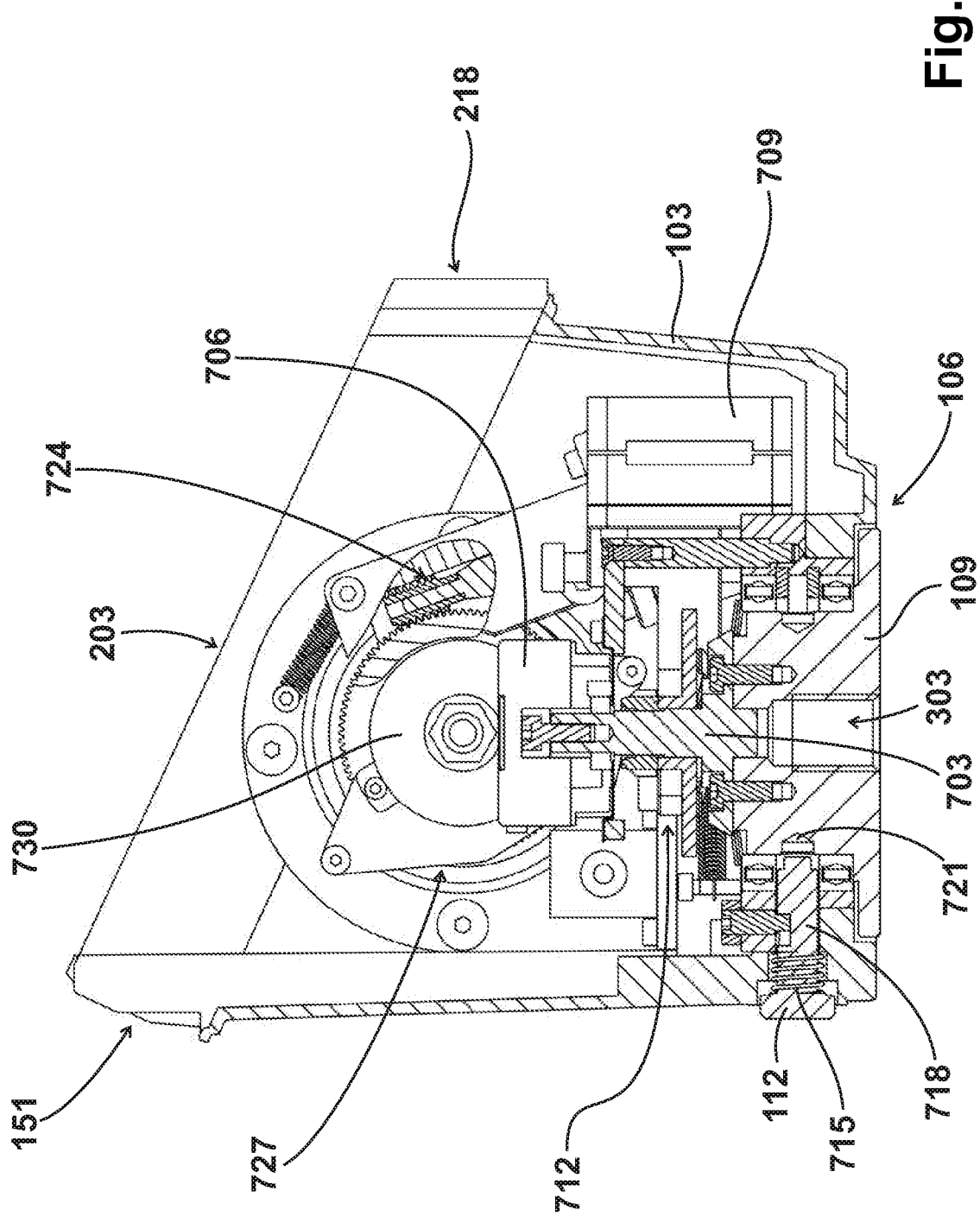
FIG. 7 shows a sectional view of the exemplary embodiment according to FIG. 1 with a first section plane placed through a center longitudinal axis.

FIG. 7 shows a sectional view of the exemplary embodiment according to FIG. 1 in a center longitudinal plane situated at right angles to the bottom side 106. It is apparent from FIG. 7 that the mounting plate 109 is rigidly coupled to a rotary shaft 703 that engages with a rotary encoder 706, with which the relative position of the housing 103 with respect to the mounting plate 109 is detectable. A rotary drive motor 709 is present for controlled motorized rotation of the housing 103 relative to the mounting plate 109. A rotary friction clutch unit 712 also allows rotation of the housing 103 relative to the mounting plate 109 by hand, independently of a motorized rotation of the housing 103 with respect to the mounting plate 109.

It is also apparent from FIG. 7 that the rotary locking knob 112 may bring a rotary locking pin 718 into engagement with a rotary locking pin receptacle 721 introduced into the mounting plate 109, against the force of a compression spring 715, when the mounting plate 109 is appropriately oriented.

Moreover, it is apparent from the illustration according to FIG. 7 that a worm gear drive unit 724 is present for pivoting the swivel handle 130, wherein the pivot position of the swivel handle 130, which is also manually pivotable, relative to the housing 103 is detectable via a swivel encoder 730, independently of a pivot motion that is driven by motor via the worm gear drive unit 724, due to providing a swivel friction clutch unit 727.

Figure 8:
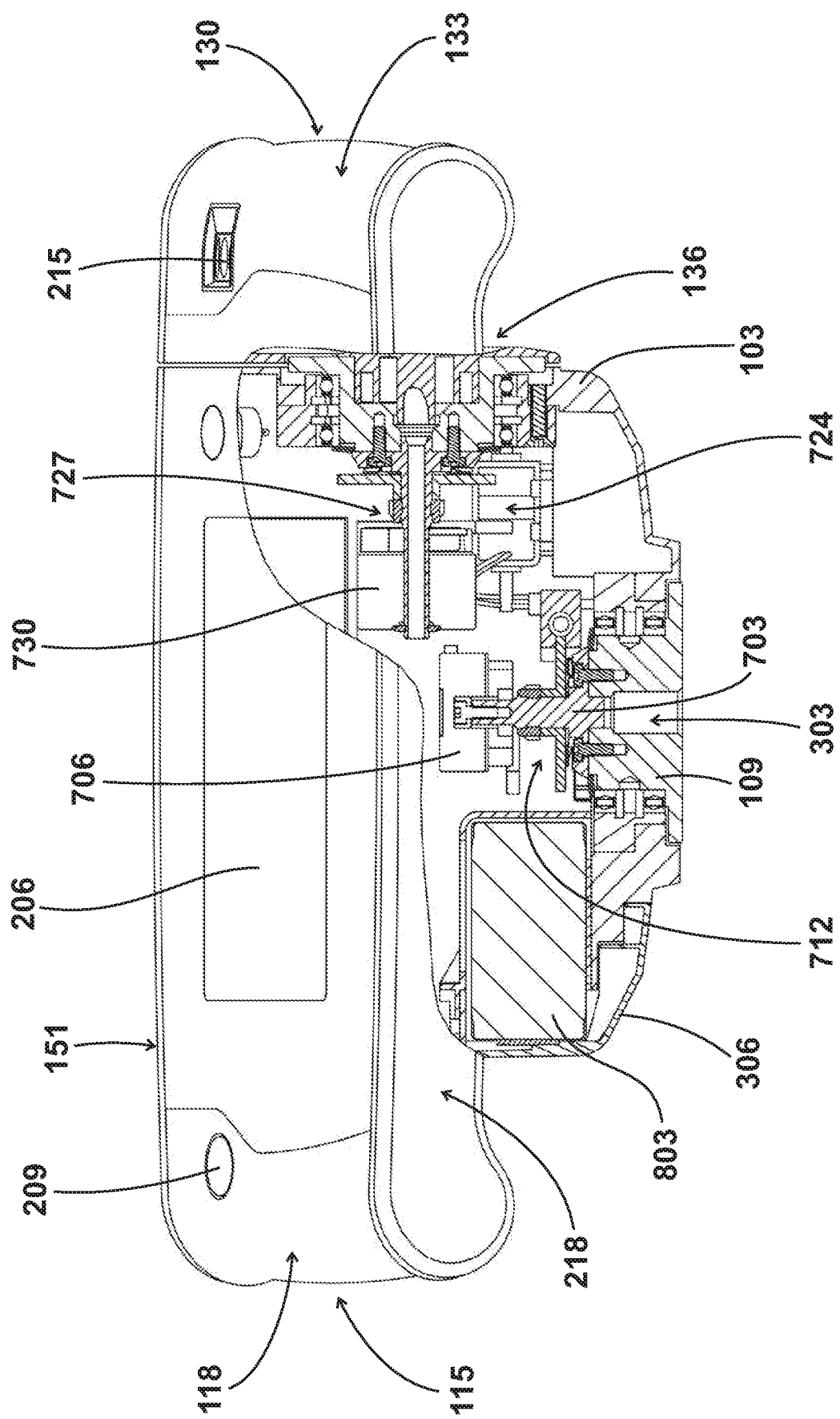
FIG. 8 shows a sectional view of the exemplary embodiment according to FIG. 1 with a second section plane placed through a center longitudinal axis, in a partial cutaway.

FIG. 8 shows the exemplary embodiment according to FIG. 1 in a partially cutaway sectional view, with a section plane that is oriented in the transverse direction and rotated by 90 degrees with respect to the section plane in FIG. 7. Apparent from FIG. 8 are the design of the pivot joint 136 as well as the rechargeable battery 803, already mentioned in conjunction with FIG. 3, which is situated in the housing 103 and covered by the battery compartment lid 306.

FIG. 9 shows a partially cutaway rear view of the exemplary embodiment according to FIG. 1 in the area of the swivel handle 130. It is apparent from FIG. 9 that the swivel handle 130 is fixable in a transport and mounting position by means of a pivot locking pin 906 which is actuatable via a pivot locking pin drive 903 and which engages in a pivot locking pin receptacle 909 in the orientation of the swivel handle 130 corresponding to FIG. 1.

FIG. 10 shows a block diagram of the circuitry of important electromechanical, electrical, and electronic elements, explained to some extent above, of the above-explained exemplary embodiment of a device according to the invention. The exemplary embodiment has a central preprocessing unit 1003 to which the following elements, explained above, are connected: special function button 121, main switch 124, USB interface 127, screen 206, on/off push switch 212, rotary pushbutton 215, charge socket 312, rotary encoder 706, rotary drive motor 709, swivel drive unit 724, swivel encoder 730, rechargeable battery 803, and pivot locking pin drive 903.

Also illustrated in FIG. 10 are the distance measuring unit 1006 and the camera 1009, which are likewise connected to the preprocessing unit 1003, and with which the distance measurement as well as targeting and documentation, explained in geater detail above, may be carried out.

In addition, for data transmission, in addition to the USB interface 127 the exemplary embodiment is equipped with a wireless module 1012 which is connected to the preprocessing unit 1003, and with which in particular wireless transmission of the measured spatial points together with associated additional data to a central data processing unit, not illustrated in FIG. 10, may take place.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for measuring spatial points, comprising: a housing including a bottom side fastenable to a tripod for rotation about a rotational axis, and a distance measuring unit positioned at a radial distance from the rotational axis and pivotable about a pivot axis oriented at a right angle to the rotational axis, the housing further including first and second handle sections provided on respective sides of the housing about the rotational axis, the first handle section rigidly connected to the housing and the second handle section pivotably connected to the housing via a pivot joint, the distance measuring unit integrated into the second handle section, and at least one of the first and second handle sections including at least one measuring control element with each measuring control element coupled to a preprocessing unit operable to assign data to the spatial points, further comprising a swivel encoder for detecting the pivot position of the second handle section.

2. The device of claim 1, further comprising a camera integrated into the second handle section.

3. The device of claim 1, further comprising a pivot locking unit operable to lock, in a transport and mounting position, the second handle section against pivoting.

4. The device of claim 3, wherein the first and second handle sections are each disposed in flush alignment with the housing in the transport and mounting position.

5. The device of claim 1, wherein a top side of the housing, disposed opposite from the bottom side, is oriented at an angle with respect to the bottom side.

6. The device of claim 1, wherein the first and second handle sections each include end sections bent in a direction pointing toward the bottom side of the housing.

7. The device of claim 1, wherein the housing includes a screen disposed between the handle sections, the screen disposed on a top side of the housing opposite from the bottom side of the housing and coupled to the preprocessing unit.

8. The device of claim 1, wherein each of the first and second handle sections includes at least one measuring control element.

9. The device of claim 1, wherein at least one measuring control element is a rotary pushbutton disposed in a respective handle section.

10. The device of claim 1, wherein at least one measuring control element is a push switch disposed in a respective handle section.

11. The device of claim 1, further comprising a rotary encoder for detecting the rotational position of the housing.

12. The device of claim 1, further comprising a rotary drive with which the housing is rotatable and a swivel drive with which the pivotable handle section is pivotable.

13. The device of claim 1, wherein the measuring control element is operable to assign additional data to spatial points in the preprocessing unit.

* * * * *